July 29, 1947.  W. W. HALBROOK  2,424,564
GEARED SPEED REDUCER WITH MEANS FOR ADJUSTING BACKLASH
Filed July 16, 1945  2 Sheets-Sheet 1
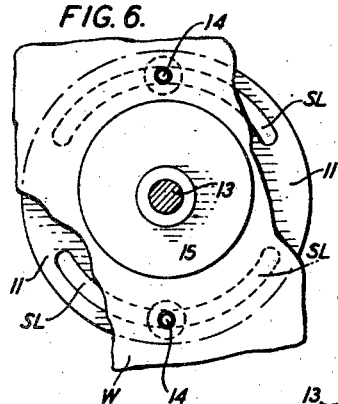
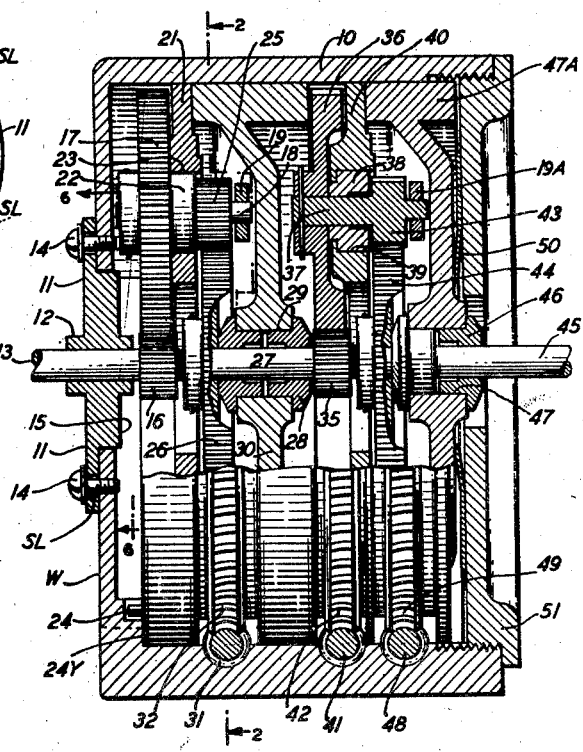
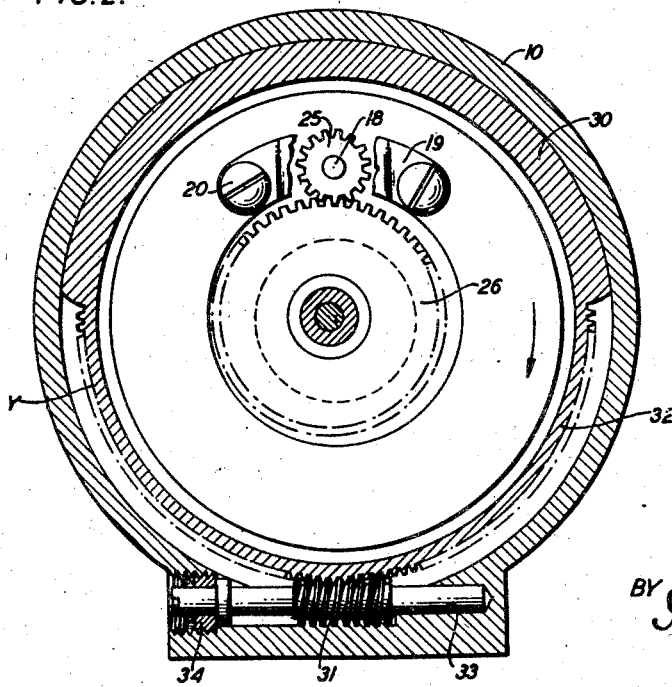
INVENTOR
W. W. HALBROOK
BY J. MacDonald
ATTORNEY July 29, 1947.  W. W. HALBROOK  2,424,564
GEARED SPEED REDUCER WITH MEANS FOR ADJUSTING BACKLASH
Filed July 16, 1945  2 Sheets-Sheet 2
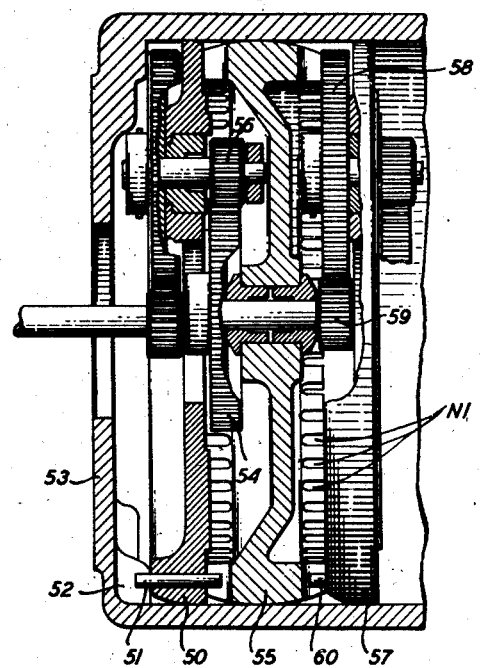
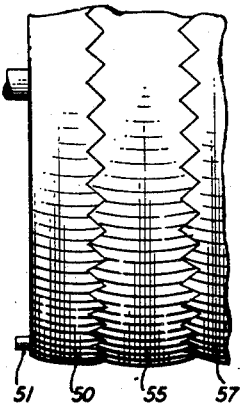
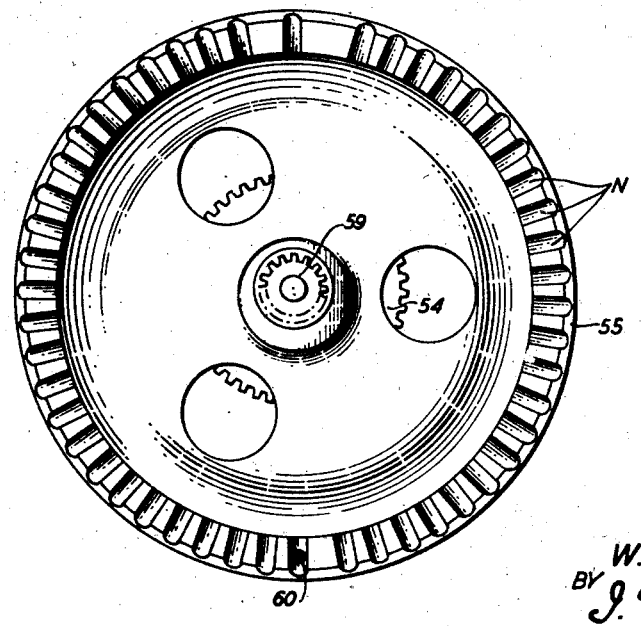
INVENTOR
W. W. HALBROOK
BY J. MacDonald
ATTORNEY Patented July 29, 1947

2,424,564

UNITED STATES PATENT OFFICE 2,424,564

GEARED SPEED REDUCER WITH MEANS FOR ADJUSTING BACKLASH

Warwick W. Halbrook, Morristown, N. J., assignor to Bell Telephone Laboratories, Incorporated, New York, N. Y., a corporation of New York Application July 16, 1945, Serial No. 605,274

4 Claims. (Cl. 74—421)

1

This invention relates to speed reduction mechanism.

The object of the present invention is the provision of a gear speed reduction mechanism which will be simple in construction, compact and wherein means is provided for accurately adjusting the meshing relation of the different gears relative to each other during the initial assembly of the mechanism and to take up backlash between the gears to compensate for wear.

In the drawing:

Fig. 1 is an assembly view showing the speed reduction mechanism of the invention with the casing in longitudinal section and a number of gears and supports therefor partly in cross-section;

Fig. 2 is a cross-sectional view taken on line 2—2 of Fig. 1 shown with a pinion mounted on one support in meshing relation with a gear mounted on an adjacent-disposed support;

Fig. 3 is a partial view of the mechanism shown in Fig. 1, shown with the gear supports modified;

Fig. 4 is a view of one of the gear supports showing the manner of keying such supports in adjusted relation to each other in the casing;

Fig. 5 is a partial view showing three of the gear supports shown in Figs. 3 and 4 modified; and Fig. 6 is a plan view of the adjustable bearing for the driving shaft of the gear reduction mechanism.

Referring to the drawing, a cylindrical casing 10 shown in Fig. 1 is provided with an opening for receiving a disc member 11. This disc member is secured to the casing 10 by a plurality of screws 14 extending as shown in Fig. 6 through arcuate slots SL in the disc so as to permit the rotating adjustment of the latter for a purpose which will be hereinafter described in detail. The disc 11 is provided with a bearing portion 12 for rotatably supporting a shaft 13 to one end of which is secured a pinion 16. The bearing portion 12 is formed eccentrically to the portion 15 of the disc which extends into the opening of the casing so that the turning of this disc is effective to position the pinion 16 on shaft 13 in adjusted meshing relation with a gear 17. This gear is keyed on a spindle 18, journaled at one end, in a support 19 best seen in Fig. 2 secured as by a pair of screws 20 to a disc-shaped support 21 fitted into the casing 10, while the opposite end of spindle 18 is journaled in a bushing 22 fitted in an opening 23 in the disc-shaped support 21. Support 21 is held against rotation in the casing 10 by a pin 24 fitted in a similarly sized notch

2 in the shoulder portion 24Y formed with the casing 10 as shown in Fig. 1 serving for locating this support in parallel relation with the wall W of the casing.

A pinion 25 which is preferably formed with the spindle 18 engages with a gear 26 keyed on one end of a spindle 27 journaled in a pair of similarly shaped bushings 28 fitted in an opening 29 disposed in eccentric relation to the periphery of a disc-shaped support 30 fitted in the casing 10 for substantially 180 degrees angular movement as effected by a worm 31 engaging the worm gear portion 32 of disc-shaped support 30, the worm 31 as best seen in Fig. 2 being journaled in a hole 33 drilled in an enlarged portion of casing 10 and its opposite end in a bushing 34 threadedly engaging a screw-threaded bore in the casing 10.

The spindle 27 which is mounted on support 30 is formed with a pinion 35 meshing with a gear 36 keyed to one end of a spindle 37 journaled at one end in a support 19A and in a bushing 38 fitted in a bore 39 formed in a disc-shaped support 40 fitted in the casing 10 for angular movement as effected by a worm 41 engaging the worm portion 42 of support 40.

The spindle 37 as best seen in Fig. 1 is formed with a pinion 43 meshing with a gear 44 keyed on one end of a shaft 45. This shaft is journaled in a pair of bushings 46 fitted in an opening 47 disposed out of center relative to the periphery of disc-shaped support 47A fitted in the casing 10 for angular movement by the rotation of a worm 48 engaging the worm portion 49 of disc-shaped support 47A for adjusting the meshing engagement of gear 44 with pinion 43 on disc-shaped support 40. The disc-shaped supports 21, 30, 40 and 47A are held collectively in parallel relation to each other against the shoulder portion 24Y of casing 10 by a spring ring 50 tensioned against the support 47A by the screw-threaded engagement of a cover 51 with the casing 10.

In the present gear reduction construction, the speed ratio of pinion 16 and gear 17 is of the order of 4 to 1, that of the pinion 25 and gear 26, 4 to 1, that of pinion 35 and gear 36, 4 to 1, and that of pinion 43 and gear 44, 4 to 1 giving a speed ratio from driving pinion 16 to the driven gear 44 and the shaft 45 actuated thereby of the order of 256 turns to one. The speed ratio however may be decreased and increased to any value desired by decreasing or increasing the numbers of intermeshing pinions and gears as the case may be and/or by changing the tooth ratio of one or more of the mating pairs of pinions and gears.

The meshing adjustment of the several pinions and gears is conveniently effected by first placing the gear support 21 in the casing 10 in position wherein the pin 24 carried by this support engages the notch in the shoulder portion 24Y of the casing and placing the disc support 30 in the casing with the worm 31 engaging the worm gear portion at the point Y giving a maximum backlash between the gear 26 and the pinion 25 and the placing of the disc supports 40 and 47 in the manner as above described in connection with support 21 followed by the tightening of the cover 51 to the casing while flexing the spring ring 50 in abutment with cover 51 and the disc support 47, this ring serving as a barrier for preventing dust particles entering the casing from the circular opening formed by bushing 46 and cover 51. Under this condition, the rotation of worm 31 is effective to rotate the disc support 30 in the direction indicated by the arrow in Fig. 2, for positioning the gear 26 in accurate meshing relation with pinion 25 and this adjustment is repeated for supports 36 and 37 in the manner described in connection with supporting disc 30.

In actual practice an adjustment as to backlash between the different gears has been obtained from the driving shaft 13 to driven shaft 45 measuring but a few degrees angle.

In the modification shown in Figs. 3 and 4 the support 50 is provided with a pin 51 extending from both sides thereof having one end engaging a notch 52 formed with the cylindrical casing 53 for holding the support against turning movement while the opposite end of pin 51 extends into one of the radial notches N formed in the adjacently disposed disc-shaped support 55 depending upon the adjustment of gear 54 mounted on this support relative to pinion 56 mounted on support 50. Similarly a support 57 is provided with a pin 60 for engaging any one of the notches N1 formed with the support 55 for holding the support 57 and the gear 58 mounted thereon in adjusted meshing relation with a pinion 59 mounted on support 55, the periphery of the supports 50, 55 and 57 having curved surfaces as shown in Figs. 3 and 4 provided to facilitate their insertion and removal from the casing 53 whenever adjustment of the intermeshing gears as to backlash is required.

Fig. 5 discloses a modification of supports 50, 55 and 57 in which interengaging saw-toothed portions are provided for preventing rotation of the supports relative to each other in the casing, this construction being particularly well adapted for the die casting of the gear supports instead of machining notches in these disc supports.

What is claimed is:

1. In a gear reduction mechanism, a cylindrically-shaped casing, a driving shaft, a bearing for said shaft secured to said casing, a pinion keyed on said shaft, a disc-shaped support fitted into said casing, a spindle mounted for rotation on said support having a gear keyed on one end thereof, said bearing being adjustable relative to said gear for positioning said pinion in adjusted meshing relation with said gear, a pinion on the other end of said spindle, another disc-shaped support fitted in said casing, a shaft mounted on said support eccentrically thereof, a gear keyed on said shaft engaging the second-mentioned pinion, the second-mentioned disc-shaped support having a worm gear portion, a worm mounted for rotation in said casing engaging said worm portion for rotating said disc-shaped support for adjustably positioning said gear in meshing relation with the second-mentioned pinion.

2. In a gear reduction mechanism, a cylindrical casing, a stationary disc-shaped support fitted into said casing, a shaft mounted for rotation on said disc-shaped support, a gear and a pinion carried by said shaft, an adjustable disc-shaped support fitted in said casing in position adjacent to said stationary support, a shaft mounted on said adjustable disc-shaped support eccentrically relative to the periphery thereof, a gear carried by said shaft, means for holding said adjustable disc-shaped support against movement in said casing following the meshing adjustment of said gear with said pinion, a driving shaft, a pinion carried by said shaft engaging the first-mentioned gear, and a bearing for said driving shaft secured to said casing and adjustable for positioning said driving shaft and the pinion carried thereby in adjusted relation with the first-mentioned gear.

3. In a gear reduction mechanism, a cylindrical casing, a plurality of disc-shaped supports, a number of said supports being movable in said casing relative to each other, means carried by the one of said supports engaging means carried by said casing for holding the last mentioned support against movement therein, a pinion and a gear mounted on each of said movable supports the pinions of said supports engaging the gears of the other of said supports consecutively to form steps of speed reduction, a driven shaft having a gear meshing with the pinion of the last speed reduction step, a cover member for said casing, and a spring ring tensioned against the support of the last speed reduction by said cover member for preventing the entrance of foreign particles from the annular space formed by an opening in said cover member and the bearing for the shaft of the last speed reduction step.

4. In a gear reduction mechanism, a cylindrical casing, a stationary disc-shaped support fitted into said casing, a bearing carried by said support, a shaft journaled in said bearing, a gear and a pinion keyed on said shaft, another disc-shaped support fitted into said casing, a shaft mounted on the last-mentioned support out of center relative to the periphery of said other disc-shaped support, a gear mounted on said shaft, means for rotating the latter disc shaped support for adjustably positioning the last-mentioned gear relative to said pinion means for holding the last-mentioned disc-shaped support in said casing relative to the first-mentioned support following the meshing adjustment of said gear with said pinion, a driving shaft, a pinion keyed on said driving shaft engaging the first-mentioned gear for driving the first-mentioned shaft.

WARWICK W. HALBROOK.

REFERENCES CITED

The following references are of record in the file of this patent:

UNITED STATES PATENTS

| Number | Name | Date |
| --- | --- | --- |
| 1,425,848 | Gabrielson | Aug. 15, 1922 |
| 1,720,971 | Schweich | July 16, 1929 |
| 1,746,599 | Mahan | Feb. 11, 1930 |
| 1,728,279 | Ramsey | Sept. 17, 1929 |